(12) United States Patent
Prasad et al.

(10) Patent No.: US 11,569,745 B2
(45) Date of Patent: Jan. 31, 2023

(54) ELECTRICAL SYSTEM HAVING BOOST CONVERTER FUNCTIONALITY

(71) Applicant: GM Global Technology Operations LLC, Detroit, MI (US)

(72) Inventors: Rashmi Prasad, Troy, MI (US); Chandra S. Namuduri, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 83 days.

(21) Appl. No.: 17/208,157

(22) Filed: Mar. 22, 2021

(65) Prior Publication Data

US 2022/0302836 A1  Sep. 22, 2022

(51) Int. Cl.
| | |
|---|---|
| *H02M 3/158* | (2006.01) |
| *H02P 27/08* | (2006.01) |
| *B60L 53/24* | (2019.01) |
| *H02M 7/5387* | (2007.01) |

(52) U.S. Cl.
CPC ............. *H02M 3/158* (2013.01); *B60L 53/24* (2019.02); *H02M 7/53871* (2013.01); *H02P 27/08* (2013.01); *B60L 2210/14* (2013.01); *H02P 2201/09* (2013.01)

(58) Field of Classification Search
CPC ...... H02P 27/08; H02P 2201/09; H02M 3/158
See application file for complete search history.

(56) References Cited

U.S. PATENT DOCUMENTS

| | | | |
|---|---|---|---|
| 4,588,933 A | 5/1986 | Sun | |
| 6,909,201 B2 | 6/2005 | Murty et al. | |
| 7,919,949 B2 | 4/2011 | Namuduri et al. | |
| 8,432,126 B2 | 4/2013 | Hasan et al. | |
| 8,606,447 B2 | 12/2013 | Namuduri et al. | |
| 9,118,210 B2 | 8/2015 | Namuduri et al. | |
| 9,153,974 B2 | 10/2015 | Reynolds et al. | |
| 9,387,766 B2 | 7/2016 | Hao et al. | |
| 9,452,672 B2 | 9/2016 | Namuduri et al. | |
| 9,573,454 B2 | 2/2017 | Holmes et al. | |
| 9,621,099 B1 | 4/2017 | Namuduri et al. | |
| 9,657,705 B2 | 5/2017 | Holmes et al. | |
| 9,868,410 B2 | 1/2018 | Namuduri et al. | |
| 9,882,521 B2 | 1/2018 | Namuduri et al. | |
| 9,973,028 B2 | 5/2018 | Namuduri et al. | |
| 10,189,470 B2 | 1/2019 | Atluri et al. | |
| 10,259,448 B2 | 4/2019 | Bucknor et al. | |
| 10,369,900 B1 | 8/2019 | Conlon | |
| 10,432,130 B2 | 10/2019 | Namuduri et al. | |

(Continued)

FOREIGN PATENT DOCUMENTS

CN   111347893 A   *  6/2020   .............. H02P 25/16

*Primary Examiner* — Kawing Chan (74) *Attorney, Agent, or Firm* — Vivacqua Crane PLLC (57) ABSTRACT

An example electrical system is disclosed. The electrical system can include a rechargeable energy storage system (RESS) and a power inverter connected to the RESS. The power inverter can be configured to provide electrical power to a traction motor. The electrical system can include a plurality of machine windings connected between the power inverter and a switch. The switch can be configured to transition between a closed state to allow current flow from an off-board power source through the plurality of machine windings to the RESS and an open state to prevent current flow between the off-board power source and the plurality of machine windings.

10 Claims, 9 Drawing Sheets

(56) References Cited

U.S. PATENT DOCUMENTS

| | | |
|---|---|---|
| 10,605,217 B2 | 3/2020 | Namuduri et al. |
| 10,917,030 B1 | 2/2021 | Hao et al. |
| 2008/0173017 A1 | 7/2008 | James |
| 2009/0184681 A1 | 7/2009 | Kuno |
| 2010/0188071 A1* | 7/2010 | Kajouke ............ G01R 31/2837 324/76.39 |
| 2012/0306424 A1 | 12/2012 | Naik et al. |
| 2014/0239876 A1 | 8/2014 | Hao et al. |
| 2016/0152153 A1* | 6/2016 | Yang ........................ H02J 7/00 320/109 |
| 2016/0185225 A1 | 6/2016 | Namuduri et al. |
| 2018/0050686 A1 | 2/2018 | Atluri et al. |
| 2018/0351398 A1 | 12/2018 | Tang et al. |
| 2019/0160953 A1 | 5/2019 | Namuduri et al. |
| 2019/0255953 A1 | 8/2019 | Conlon |
| 2021/0044135 A1 | 2/2021 | Lee et al. |
| 2022/0297555 A1 | 9/2022 | Prasad et al. |
| 2022/0297557 A1 | 9/2022 | Prasad et al. |
| 2022/0302835 A1 | 9/2022 | Prasad et al. |
| 2022/0302836 A1 | 9/2022 | Prasad et al. |
| 2022/0302867 A1 | 9/2022 | Prasad et al. |

* cited by examiner

ELECTRICAL SYSTEM HAVING BOOST CONVERTER FUNCTIONALITY

The present disclosure relates to relates to a vehicle electrical system having boost conversion functionality.

A hybrid electric or battery electric vehicle transmission typically includes one or more high-voltage machine electric machines in the form of a motor generator unit or an electric traction motor. Electric machines deliver/charge power to or draw power from a rechargeable direct current (DC) battery pack. The energized electric machines adjust torques of the various gear sets of the transmission to achieve optimal system efficiency. Voltage converters are typically used for converting voltages to suitable levels for use by the electric machines and/or accessory loads in the vehicle.

Semiconductor switches of a power inverter module are controlled via pulse-width modulation or other switching control signals to convert the battery output voltage to an alternating current (AC) output voltage. The AC output voltage from the power inverter module is ultimately transmitted to the individual phase windings of the electric machine. The energized electric machine powers the drivetrain of the vehicle.

SUMMARY

An example electrical system is disclosed. The electrical system can include a rechargeable energy storage system (RESS) and a power inverter connected to the RESS. The power inverter can be configured to provide electrical power to a traction motor. The electrical system can include a plurality of machine windings of the traction motor connected between the power inverter and a switch. The switch can be configured to transition between a closed state to allow current flow from an off-board power source through the plurality of machine windings to the RESS and an open state to prevent current flow between the off-board power source and the plurality of machine windings.

In other features, the electrical system includes an inductor connected in series between the plurality of machine windings and the accessory load, wherein the inductor is configured to mitigate at least one of current ripple or torque ripple.

In other features, the power inverter comprises a set of semiconductor switches that are configured to convert direct current (DC) power to alternating current (AC) power.

In other features, each semiconductor switch of the set of semiconductor switches comprises a voltage-controlled switching device.

In other features, the voltage-controlled switching device comprises at least one of an insulated gate bipolar transistor (IGBT), a metal-oxide semiconductor field effect transistor (MOSFET), or wideband-gap device (WBG).

In other features, the power inverter comprises a plurality of phase legs, each phase leg of the plurality of phase legs comprising a pair of semiconductor switches of the set of semiconductor switches, wherein each phase leg is connected to a corresponding phase terminal of the plurality of machine windings of the traction motor.

In other features, at least one semiconductor switch of a first phase leg and a second phase leg are pulse-width modulated to allow current flow through at least one of the first phase leg and the second phase leg.

In other features, current flows through at least two phases of the plurality of machine windings to increase a voltage from the off-board power source from a first voltage to a second voltage.

In other features, the switch comprises at least one of a contactor or a solid-state relay.

An example electrical system is disclosed. The electrical system can include a rechargeable energy storage system (RESS) and a power inverter connected to the RESS. The power inverter can be configured to provide electrical power to a traction motor. The electrical system can include a plurality of machine windings of the traction motor connected between the power inverter and a switch. The electrical system includes a controller connected to the switch and to the power inverter. The controller is configured to transmit control signals to the power inverter and to the switch to allow current flow from an off-board power source through the plurality of machine windings to the RESS during a first operational state and to prevent current flow between the off-board power source and the plurality of machine windings during a second operational state.

In other features, the electrical system includes an inductor connected in series between the plurality of machine windings and the off-board power source, wherein the inductor is configured to mitigate at least one of current ripple or torque ripple.

In other features, the power inverter comprises a set of semiconductor switches that are configured to convert direct current (DC) power to alternating current (AC) power.

In other features, each semiconductor switch of the set of semiconductor switches comprises a voltage-controlled switching device.

In other features, the voltage-controlled switching device comprises at least one of an insulated gate bipolar transistor (IGBT), a metal-oxide semiconductor field effect transistor (MOSFET), or wideband-gap (WBG) semiconductor power device (WBG) e.g., SiC MOSFET, SiC JFET, GaN FET.

In other features, the power inverter comprises a plurality of phase legs, each phase leg of the plurality of phase legs comprising a pair of semiconductor switches of the set of semiconductor switches, wherein each phase leg is connected to a corresponding phase terminal of the plurality of machine windings of the traction motor.

In other features, at least one semiconductor switch of a first phase leg and a second phase leg are pulse-width modulated to allow current flow through at least one of the first phase leg and the second phase leg.

In other features, current flows through at least two phases of the plurality of machine windings to increase a voltage from the off-board power source from a first voltage to a second voltage.

In other features, the controller receives software updates via over-the-air programming.

In other features, the controller is configured to transmit control signals to control the current flow to mitigate torque disturbance and achieve desired voltage boost.

A method is disclosed that includes determining whether a connection with an off-board power source has been established and transmitting at least one control signal to power inverter and to a switch to allow current flow from the off-board power source through a plurality of machine windings to a rechargeable energy storage system (RESS) during a first operational state and to prevent current flow between the off-board power source and the plurality of machine windings during a second operational state when the connection has been established.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Some hybrid electric or battery electric vehicles may include native onboard rechargeable energy storage systems (RESS) that store voltage that is greater than a voltage available to charge the vehicle's RESS. In these instances, the vehicle may require an additional DC-DC converter to step up voltage from an off-board power source to the RESS during charging. Additional DC-DC converters can result in an increase in cost, mass, and volume of the vehicle.

The present disclosure describes an electrical system that provides boost converter functionality via inverter switches and machine windings during vehicle charging. For example, a controller, such as an inverter controller, can selectively transition one or more switches from an open state to a closed state, or vice versa, to cause electrical power to be directed from an off-board power source to the RESS. The electrical power can be directed through one or more machine windings through an inverter such that the voltage is stepped up relative to the voltage of the off-board power source.

Figure 1A:
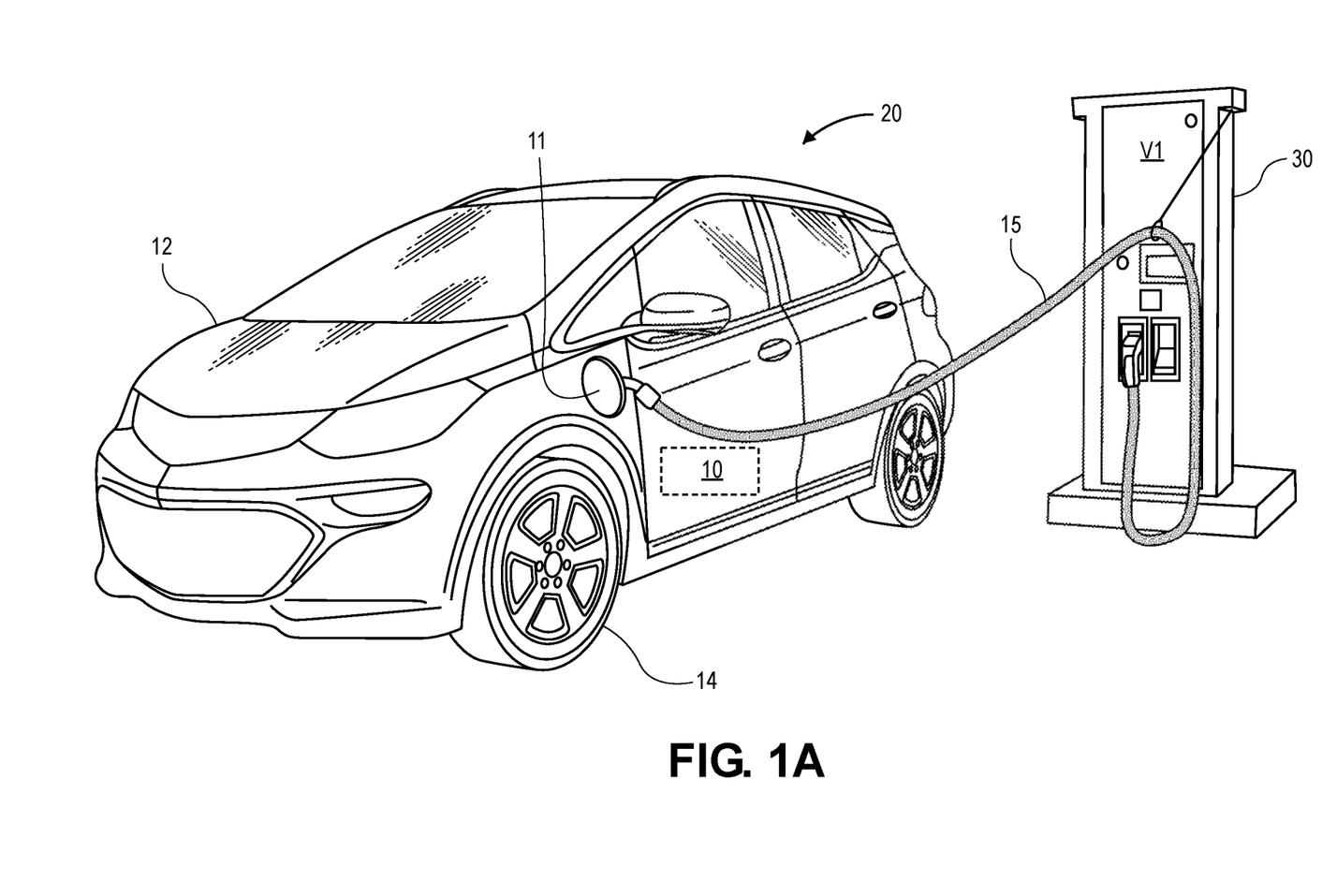
FIG. 1A is a schematic illustration of an example motor vehicle connected to an off-board DC fast-charging station.

FIG. 1A illustrates an example direct current (DC) charging circuit 10 as part of a motor vehicle 20. The vehicle 20 is depicted as undergoing a DC fast-charging operation in which the DC charging circuit 10 is electrically connected to an off-board DC fast-charging station 30 via a charging port 11 and a charging cable 15, e.g., using an SAE J1772 charge connector, CHAdeMO, or another suitable regional or national standard charging plug or connector. The present teachings are independent of the particular charging standard that is ultimately employed in a DC fast-charging operation involving the DC fast-charging station 30, and thus the above-noted examples are merely illustrative.

The DC charging circuit 10 may be used as part of the motor vehicle 20, as well as other electrical systems such as stationary or mobile power plants robots or platforms. For vehicular applications, non-motor vehicles such as aircraft, marine vessels, and rail vehicles may enjoy similar benefits. In example implementation, the DC charging circuit 10 may be used as part of a powertrain of a mobile system, such as the example vehicle 20. For illustrative consistency, an application of the DC charging circuit 10 as an integral part of the vehicle 20 in a motor vehicle context will be described hereinafter without limiting the present disclosure to such an implementation.

Figure 1B:
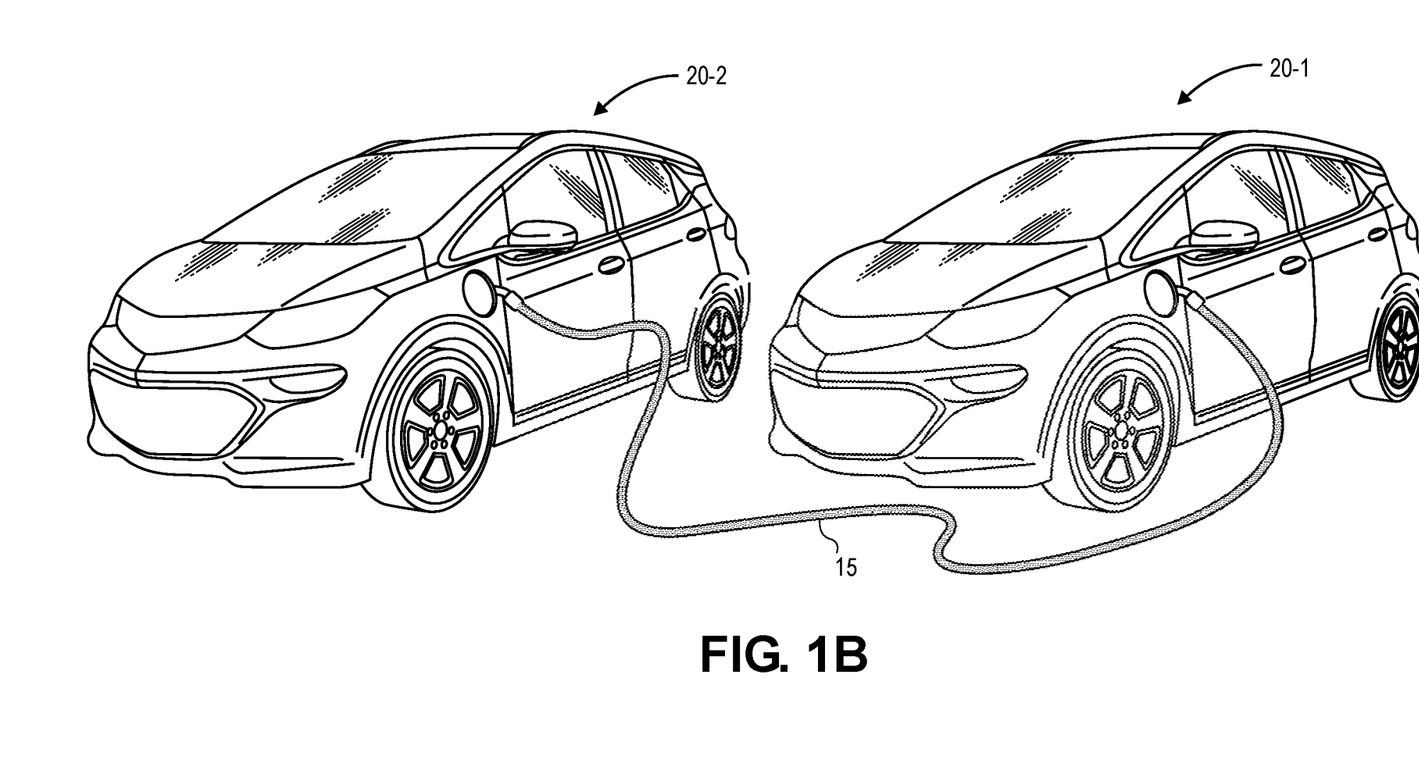
FIG. 1B is a schematic illustration of an example motor vehicle connected to another motor vehicle.
Figure 2:
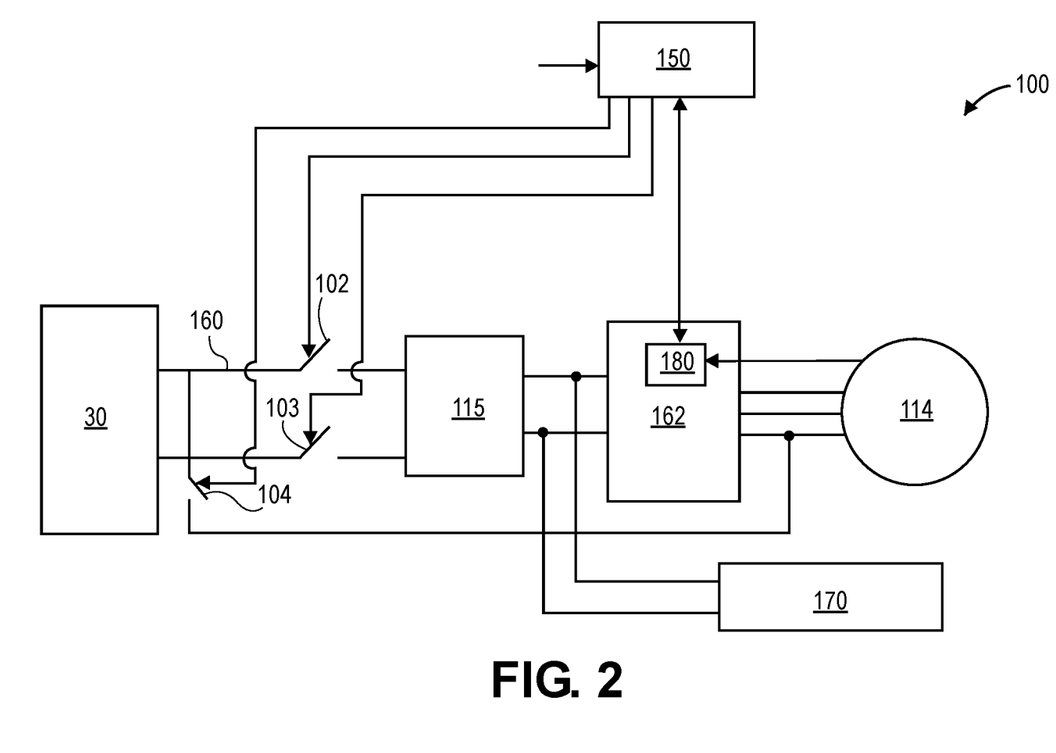
FIG. 2 is a block diagram of an example electrical system according to an example implementation.

The vehicle 20 of FIG. 1A includes a body 12 and drive wheels 14. The body 12 may define or include the charging port 11 at a user-accessible location. The vehicle 20 may be variously embodied as a plug-in electric vehicle having onboard rechargeable energy storage system (RESS) 115 as shown in FIG. 2 and described below, e.g., a multi-cell lithium ion, zinc-air, nickel-metal hydride, or lead acid direct current battery pack that can be selectively recharged using the off-board DC fast-charging (DCFC) station 30 of FIG. 1A. The DC charging circuit 10 incorporates powertrain/traction drive components of the vehicle 20 whose ordinary functions may include powering a traction motor 114 to generate and deliver motor torque to the drive wheels 14 for propulsion of the vehicle 20, or for performing other useful work aboard the vehicle 20. FIG. 1B illustrates an example implementation of vehicle-to-vehicle (V2V) charging. As shown, a first vehicle 20-1 may be used to at least partially charge a second vehicle 20-2, or vice versa. The first vehicle 20-1 and/or the second vehicle 20-2 may include an electrical system as described herein.

Figure 3:
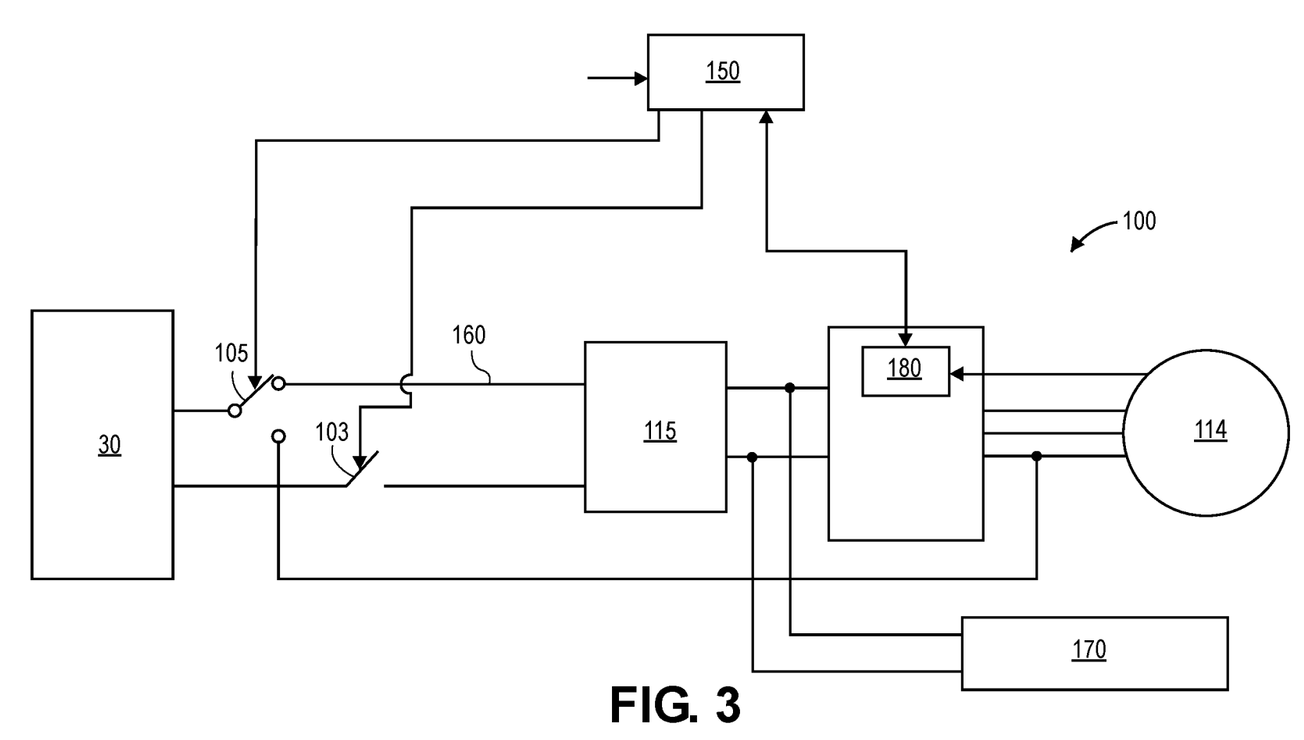
FIG. 3 is a block diagram of an example electrical system according to an example implementation.
Figure 4:
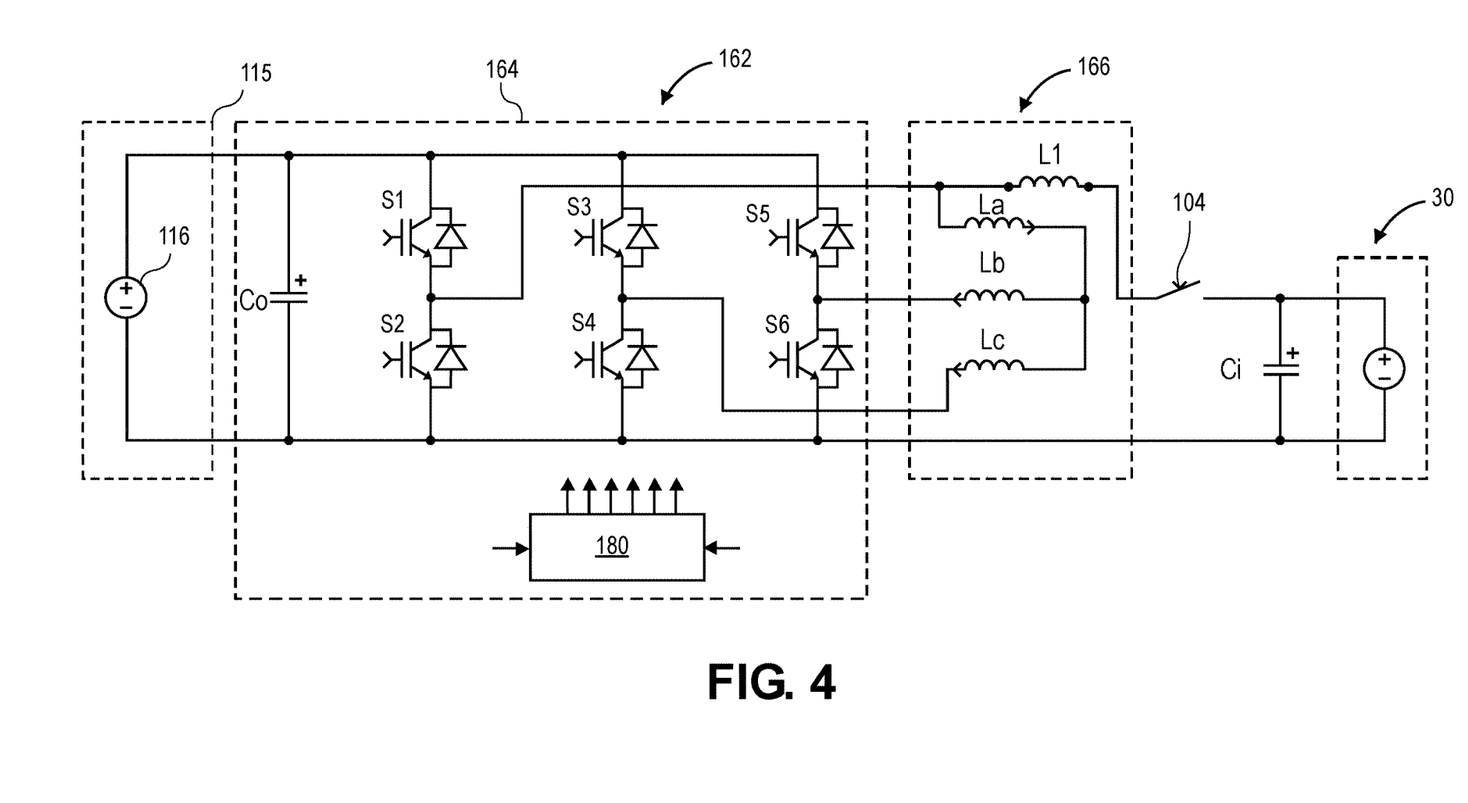
FIG. 4 is a circuit schematic of the example electrical system according to an example implementation.
Figure 5:
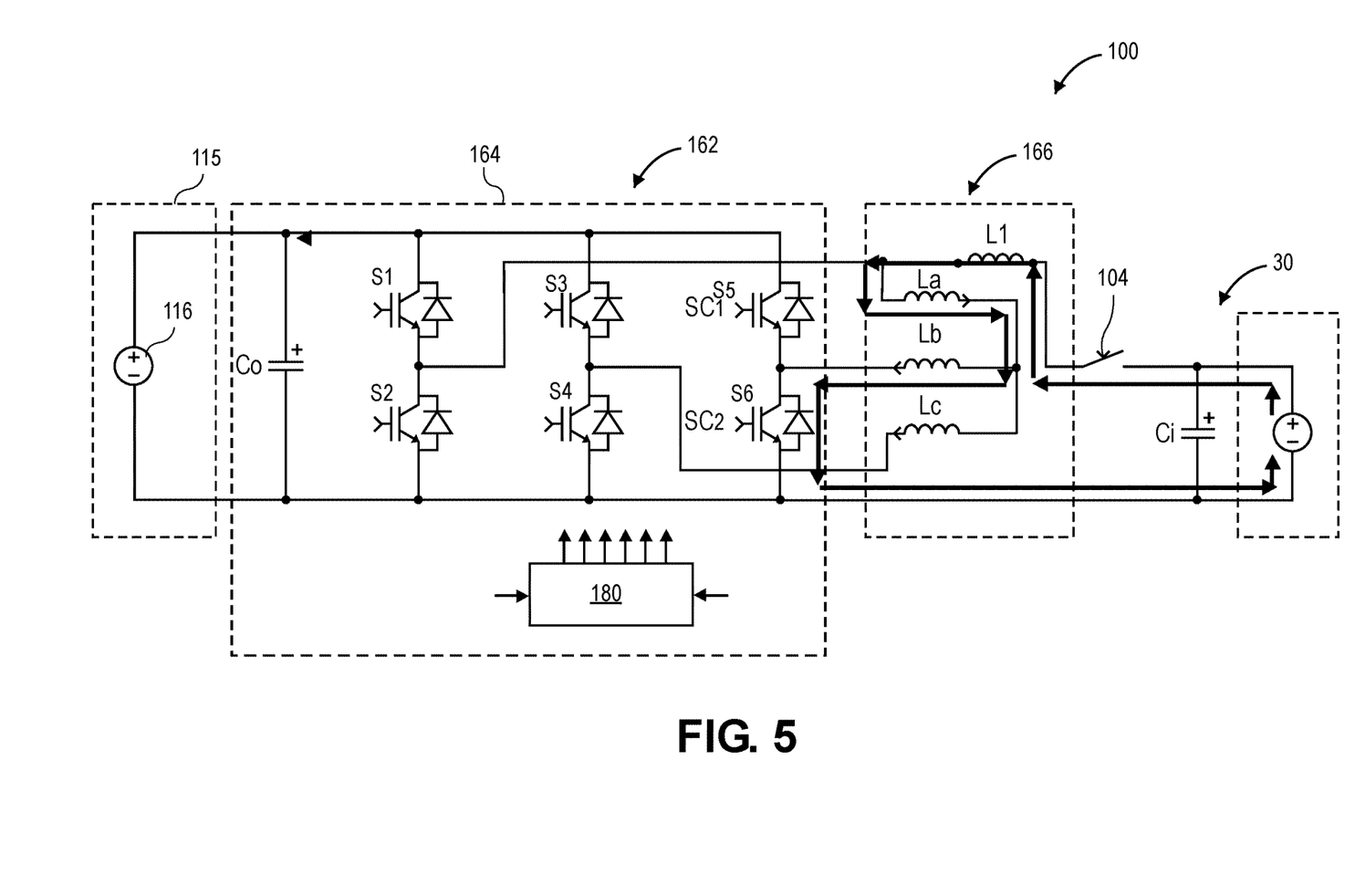
FIG. 5 is a circuit schematic of the example electrical system illustrating a first operational state according to an example implementation.
Figure 6:
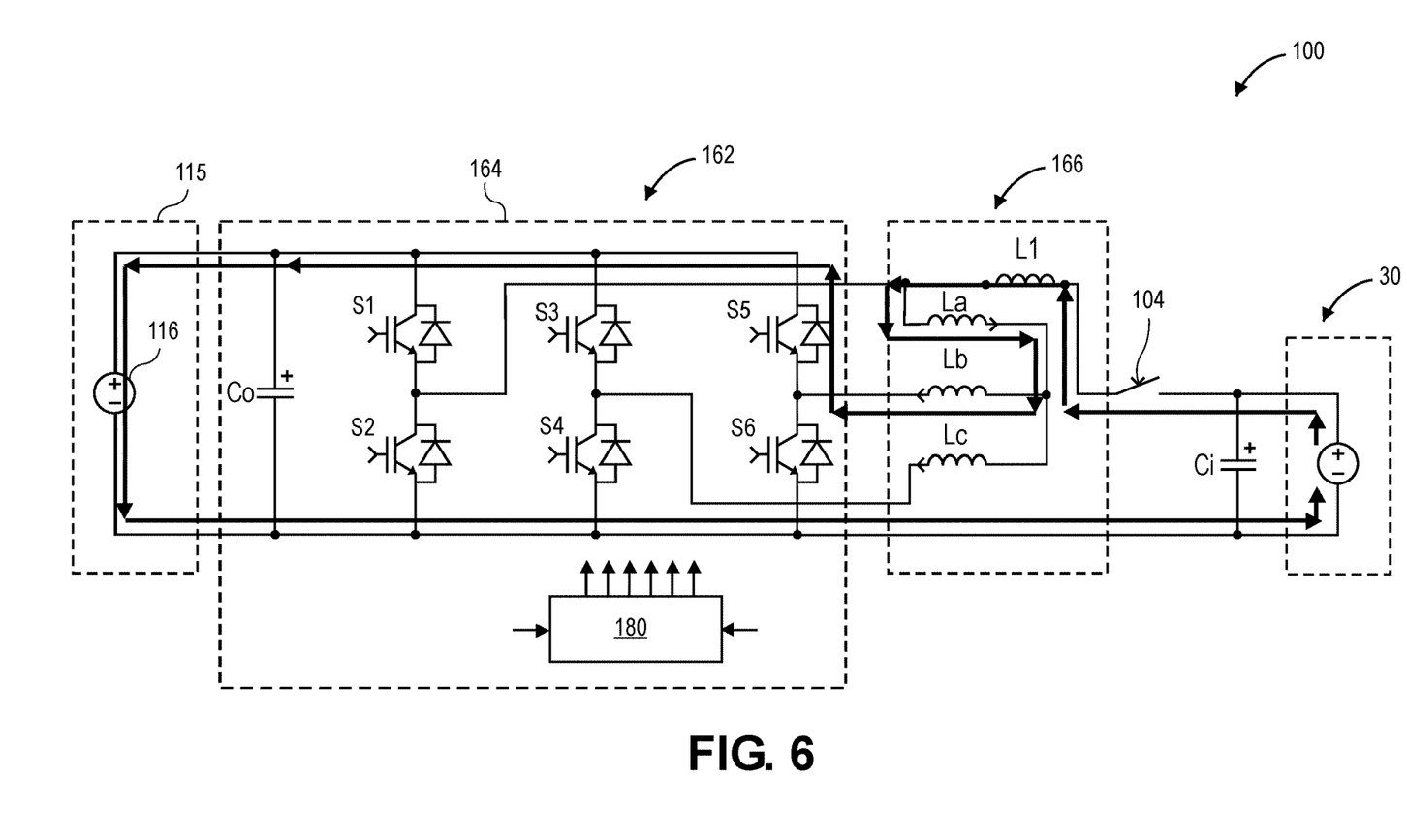
FIG. 6 is a circuit schematic of the example electrical system illustrating a second operational state according to an example implementation.

FIGS. 2 and 3 illustrate block diagrams of an electrical system 100 of the DC charging circuit 10 for the vehicle 20 according to various implementations. As shown, the electrical system 100 includes the onboard rechargeable energy storage system (RESS) 115 adapted for storing high-voltage electrical energy used for propelling an electric-drive vehicle, such as the vehicle 20 of FIG. 1. RESS 115 may be a deep-cycle, high-ampere capacity battery system rated for approximately four hundred (400) to approximately eight hundred (800) volts direct current (VDC) or more, for example, depending on a desired vehicle range, gross vehicle weight, and power ratings of the various loads drawing electrical power from the RESS 115. A DC link capacitor Co can be connected across positive and negative terminals as illustrated in FIGS. 4 through 6.

The RESS 115 may include one or more high-voltage, independently rechargeable battery packs. The RESS 115 may be connected to the DCFC station 30 through a high-voltage DC connection 160 and a power inverter 162 for governing the transmission of electrical energy to and from the traction motor 114.

The vehicle 20 may further include one or more accessory loads 170. In an example implementation, the accessory loads 170 can comprise various loads that draw electrical power from the electrical system 100. In an example implementation, the RESS 115 may be adapted to store voltage at a first voltage, such as approximately eight hundred (800) VDC. However, an off-board power source, such as the off-board DC fast-charging station 30 or another vehicle, may be configured to supply voltage at a second voltage that is less than the first voltage, such as four hundred (400) VDC. As discussed in greater detail below, the electrical system 100 can be configured to boost a voltage supplied by the off-board power source.

Referring to FIG. 2, the electrical system 100 further includes a controller 150, a first switch 102, a second switch 103, and a third switch 104 to control a boost DC-DC operation for delivering electrical power to the RESS 115 from the off-board power source. While the off-board power source illustrated comprises a DC fast-charging station 30, it is understood that the off-board power source may also comprise another vehicle.

The switches 102, 103, and 104 may comprise contactors or solid-state relays that are adapted to close under electrical load so as to ensure the instantaneous or near instantaneous delivery of electrical power to the vehicle's propulsion system and to drive any number of in-vehicle accessories. As illustrated in FIG. 3, the electrical system 100 may comprise a Single Pole Double Throw (SPDT) switch 105. In this implementation, the SPDT 105 can replace switches 102 and 104 shown in FIG. 2 and is controllable by the controller 150.

The controller 150 can include at least one processor and sufficient memory for storing computer-readable instructions. The memory includes tangible, non-transitory memory, e.g., read only memory, whether optical, magnetic, flash, or otherwise. The controller 150 also includes sufficient amounts of random-access memory, electrically erasable programmable read only memory, and the like, as well as a high-speed clock, analog-to-digital and digital-to-analog circuitry, and input/output circuitry and devices, as well as appropriate signal conditioning and buffer circuitry. The controller 150 can receive charging request signals from one or more electronic control units (ECUs) of the vehicle 20. For example, an ECU associated with the vehicle to charging station or vehicle to vehicle communication system may provide a signal indicating that the RESS 115 needs to be charged from a source that has lower voltage than the RESS voltage, and the controller 150 can initiate the boost DC-DC operation as discussed below. If the DC fast-charging station 30 is capable of directly supplying the required charging voltage for the RESS 115, the switches 102 and 103 can be closed and switch 104 can be open, e.g., the boost mode operation not used.

As shown in FIGS. 2 through 7, the electrical system 100 further includes an inverter controller 180 that controls operation of semiconductor switches S1 through S6 of the power inverter 162, which are described in greater detail below with respect to FIGS. 4 through 6. The inverter control 180 can include at least one processor and sufficient memory for storing computer-readable instructions. The memory includes tangible, non-transitory memory, e.g., read only memory, whether optical, magnetic, flash, or otherwise. The inverter controller 180 also includes sufficient amounts of random-access memory, electrically erasable programmable read only memory, and the like, as well as a high-speed clock, analog-to-digital and digital-to-analog circuitry, and input/output circuitry and devices, as well as appropriate signal conditioning and buffer circuitry.

In an example implementation, the inverter controller 180 can receive signals from the controller 150 and/or from sensors within the traction motor 114. For example, the traction motor 114 can include phase current sensors and/or rotor position sensors and provide signals indicative of a phase current and/or a position of the rotor, respectively. The inverter control 180 can control the semiconductor switches S1 through S6 by supplying a signal to one or more gates to cause the semiconductor switches S1 through S6 to transition between an open state and a closed state, as discussed in greater detail below.

FIGS. 4 through 6 illustrate example schematics of the electrical system 100. The power inverter 162 can comprise a bidirectional DC-to-AC and AC-to-DC power converter, which may be part of a traction power inverter module (TPIM), that connects the off-board power source, e.g., the off-board DC fast-charging station 30 or vehicle, to the RESS 115 via machine windings 166. The machine windings 166 can comprise windings of the traction motor 114, which are illustrated as machine windings La, Lb, and Lc. For example, during vehicle 20 operation, the machine windings 166 can provide three-phase current to create a rotating magnetic field to rotate a rotor of the traction motor 114. While illustrated as including only three machine windings 166, it is understood that the traction motor 114 may include additional machine windings 166 depending on a motor configuration. The power inverter 162 may incorporate multiple phases and respective motor control modules operable to receive motor control commands and control inverter states therefrom for providing motor drive or regenerative functionality.

The power inverter 162 may comprise a set 164 of semiconductor switches S1 through S6 (also referred to herein as "inverter switches") that cooperatively convert direct current (DC) power from the RESS 115 to alternating current (AC) power for powering the traction motor 114 via high frequency switching during vehicle operation, e.g., a motoring mode of operation. Each semiconductor switch S1 through S6 may be embodied as a voltage-controlled switching device in the form of a silicon insulated gate bipolar transistor (IGBT), a silicon carbide (SiC) metal-oxide semiconductor field effect transistor (MOSFET), a silicon (Si) superjunction MOSFET, a Gallium nitride (GaN) field-effect transistor (FET), a SiC junction-gate field-effect transistor (JFET), other wideband-gap (WBG) or ultra-wideband-gap semiconductor power switching device (UWBG), or other suitable switch having a corresponding gate to which a gate signal is applied to change the on/off state of a given switch. There is typically at least one pair of semiconductor switches for each phase of the three-phase traction motor 114. Each pair of switches, e.g., switches S1 and S2 (Phase A), switches S3 and S4 (Phase B), and switches S5 and S6 (Phase C), may referred to as phase legs of the power inverter 162. For example, the power inverter 162 may include at least three (3) phase legs in an example implementation. Each phase leg of the power inverter 162 is connected to a corresponding machine phase terminal, e.g., one of the machine windings 166.

Referring to FIGS. 5 and 6, the off-board power source can be adapted to provide converted electrical power to the RESS 115 during charging. For example, the electrical system 100 can step up a voltage supplied by the off-board power source. The battery pack 116 may be adapted to store voltage at the first voltage, which is a higher voltage than the second voltage, e.g., the first voltage may be eight hundred (800) VDC and the second voltage may be four hundred (400) VDC. During this operational state, the switches S1 and S2, which are connected to the off-board power source (400 VDC in this example) are in an open state to prevent current flow from the first voltage (battery pack). Switches S3 of Phase B and switch S5 of Phase C (in FIG. 5) are maintained in an open state during this time period. Switch S4 of Phase B and switch S6 of Phase C (in FIG. 6) can be subjected to PWM at a duty cycle and phase shift between the two legs to provide increased voltage to the load or battery of the receiving vehicle 20, e.g., in an event of V2V charging, across the vehicle DC bus filter capacitor C0.

The switches S4 and S6 can be pulse width modulated with a programmable duty cycle and phase shift with respect to one another. The PWM frequency, duty cycle, and/or phase shift between the Phases B and C can be a function of charging power and/or rotor position of the traction motor 114.

During the charging operation, the inductances of machine windings La, Lb, Lc and the switches S4 and/or S6 together with series inductor L1, freewheeling diodes of S3 and/or S5 can function as an interleaved two-phase boost converter. It is understood that the controller 150 can select an optimal phase selection mode to mitigate disturbance to torque and boost converter functionality. For example, the controller 150 can use a lookup table based on one or more vehicle parameters, e.g., torque, charging, etc., and output a PMW signal corresponding to the vehicle parameters to cause one or more inverter switches S1 to S6 to operate as described above. For example, based on the switch selection, a desired boost converter functionality can be selected to charge the RESS 115 and mitigate torque disturbance.

In some implementations, software for the controller 150 may be updated based via over-the-air programming. For example, software updates can be transmitted to the controller 150 via one or more suitable communication networks from a data source, such as an original equipment manufacturer (OEM). The over-the-air updates can provide desired parameters to adjust charging power by adjusting the inverter control signals, e.g., current command, frequency, duty cycle, phase shift, etc., for one or more switches S1 to S6 according to a charging power level via the inverter controller 180.

In the boost mode PWM operational state, switches S5 and S3 of Phases B and C are in an open state. In the instance of the PWM operation where the phase B on state is shown, switch S6 and switch 104 are in the closed state to allow current flow from the off-board power source to the machine windings Lb, La, and filter inductor L1. To increase, or step-up, the voltage from the off-board power source, the inverter controller 180 transitions the switch S6 between the closed state (FIG. 5) and the open state (FIG. 6) such that the electrical system 100 performs a boost conversion. During the PWM off state of phase B, the energy stored in the inductor L1, La, Lb is transferred to the RESS 115 via the freewheeling diode of S5. Similarly, the switch S4 can be modulated on and off to allow boost action via L1, La, Lc and freewheeling diode of S3. The PWM action of S6 and S4 can have a phase shift to minimize the current/torque ripple in the machine and current ripple in the source and RESS. Thus, the machine phase windings 166 in conjunction with the inverter phase leg switches can increase the first voltage to the second voltage, e.g., perform a boost conversion.

When utilized, filter inductor L1 can be positioned in series with the machine windings 166 to reduce, e.g., mitigate, current ripple as well as machine torque ripple. It is understood that the filter inductor may be optional in some implementations. In the example illustrated, the switch S6 can be subjected to a pulse-width-modulation signal from the controller 180 to transition switch S6 between the open state and the closed state such that the electrical system 100 converts a voltage provided to the RESS 115 from the first voltage to the second voltage. In an implementation in which the inverter switches comprise of MOSFETs, the complementary switch in each phase can be tuned on when the lower switch is turned off during the boost converter operation to minimize the freewheeling diode losses.

Figure 7:
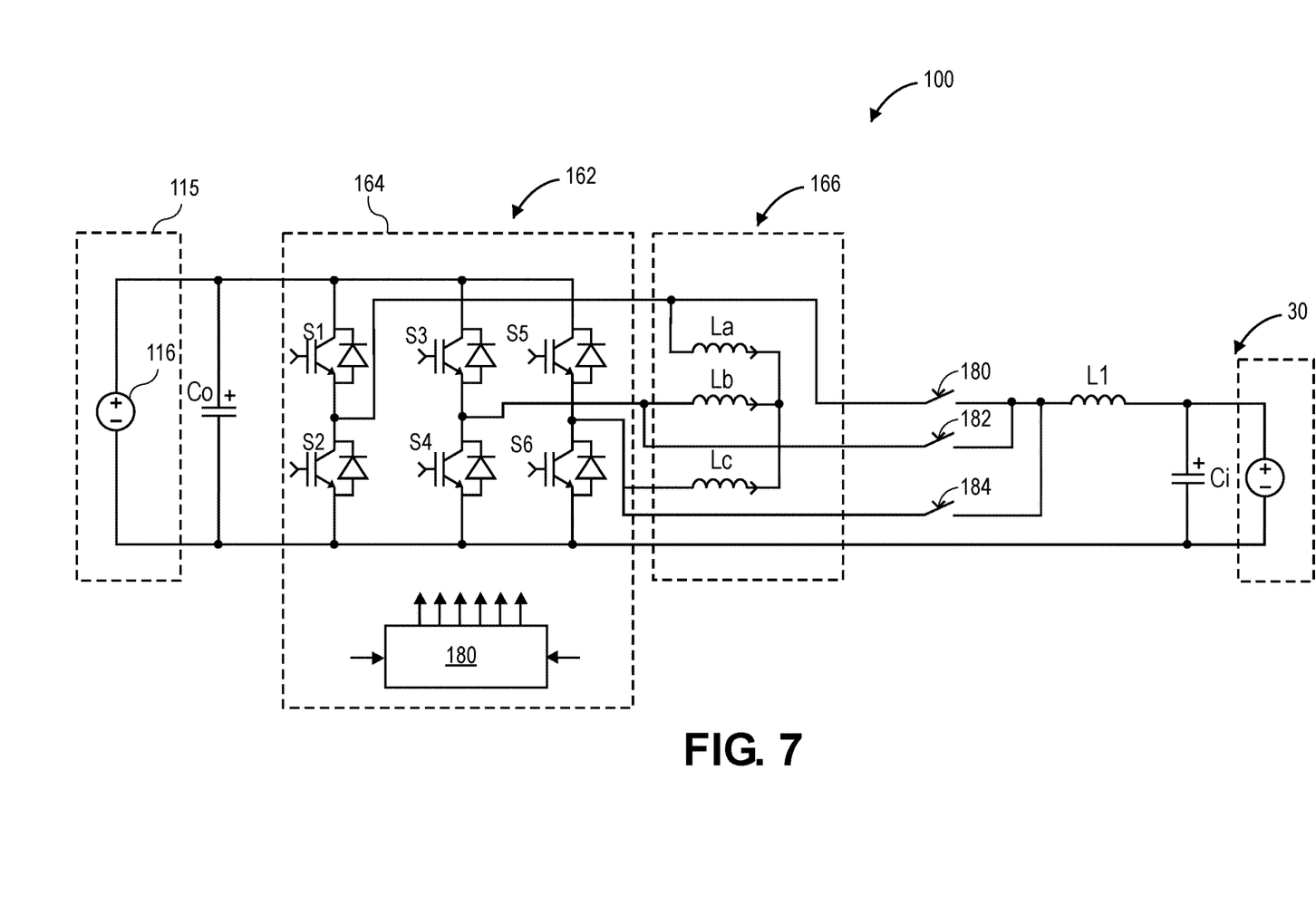
FIG. 7 is a circuit schematic of the example electrical system another example implementation.

FIG. 7 illustrates another example implementation of the electrical system 100. As shown, the electrical system 100 can include switches 182 and 184. Similar to the switch 104, the switches 182 and 184 can comprise contactors or solid-state relays. The switches 182 and 184 are controllable by the controller 150 such that current flow can be selectively directed according to a particular phase of operation. For example, the controller 150 may selectively control the switches S1 through S6 and/or the switches 104, 182, and 184 based on a desired vehicle charging operation, e.g., mitigate torque disturbance during the boost operation. In some implementations, the controller 150 may include a lookup table that relates charging input to vehicle charging criteria. In one or more implementations, use a single pole triple position relay or three separate relays, e.g., switches 104, 182, 184 (see FIG. 7) can be used to select an optimum phase to be connected to the DC fast-charging station 30 and to modulate the remaining phases as described above.

Figure 8:
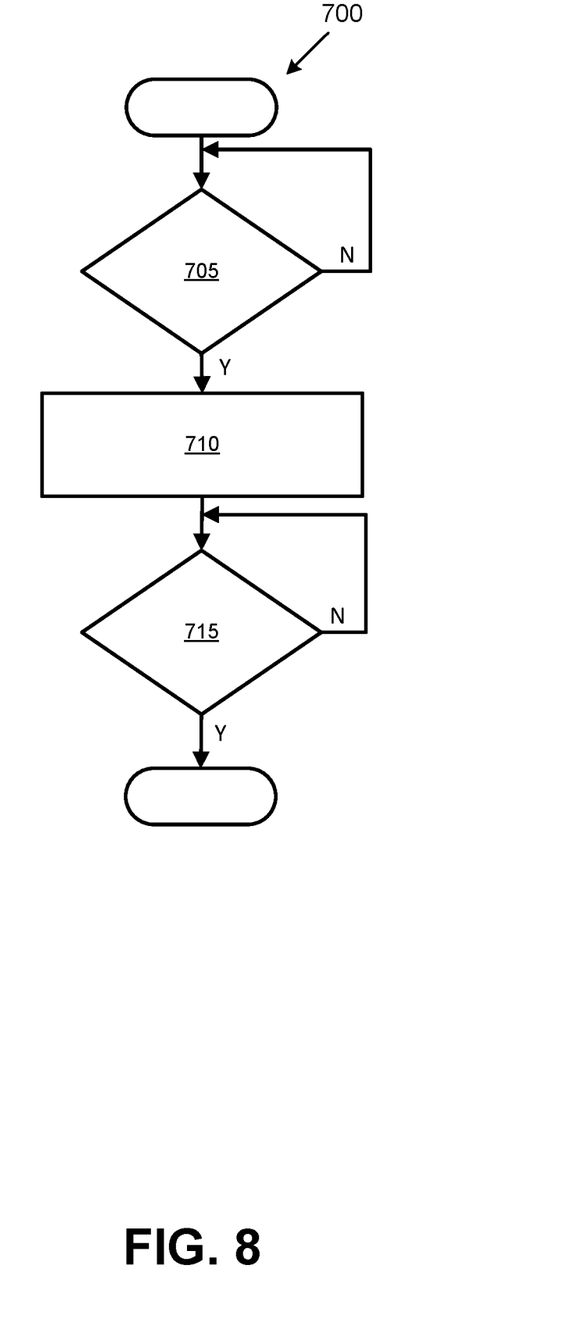
FIG. 8 is a flow chart illustrating an example process for providing power to a RESS of a vehicle via an off-board power source according to an example implementation.

FIG. 8 is a flowchart of an exemplary process 700 for providing power to the RESS 115 of the vehicle 20 via an off-board power source. Blocks of the process 700 can be executed by the controller 150 and/or the inverter control 180. At block 705, a determination is made whether boost charging (charging of the 800V RESS from a 400V DC fast-charging station 30 in this exemplary case) is needed and an electrical connection between an off-board power source and the high-voltage DC bus connection 160 has been established. For example, the controller 150 may receive an input signal indicating a charge initiation through suitable handshake protocols and/or signals with off board power source controller and establishes the electrical connection. If the electrical connection has not been established, the 700 returns to block 705.

If the electrical connection has been established, the controller 150 transmits one or more control signals to the inverter 162 and/or the switches 102, 103, 104, and/or 105 at block 710. Based on the input from the controller 150 the switches 102, 103, 104, and/or 105 transition to a desired operating state, e.g., the open state or the closed state, and the inverter controller 180 outputs voltage signals that cause the switches S1 through S6 of the inverter 162 to provide the boost function. For example, the switch 102 may be transitioned to the open state to prevent current flow from the off-board power source to the RESS 115, and the switch 104 may be transitioned to the closed state to allow current flow from the off-board power source to the machine windings 166 to step up the voltage provided to the RESS 115. As discuss above in conjunction with FIGS. 5 and 6, the switch S6 may be modulated to increase the voltage at the RESS 115 due to boost converter properties of causing current to flow through the machine windings 166 via the inverter controller 180. While the present disclosure describes modulating the switch S6, it is understood that to step up the voltage, it is understood that the switch S4 may also be modulated in accordance with the operation described above and illustrated in FIGS. 5 and 6 via the inverter controller 180.

At block 715, the controller 150 determines whether the electrical connection between the off-board power source has been disconnected. If the controller 150 has not determined that the electrical connection has been disconnected, the process 700 returns to block 715. Otherwise, the process 700 ends.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:
1. An electrical system, comprising:
 a rechargeable energy storage system (RESS);

a power inverter connected to the RESS, the power inverter configured to provide electrical power to a traction motor;

a plurality of machine windings of the traction motor connected between the power inverter and a switch;

the switch configured to transition between a closed state to allow current flow from an off-board power source through two of the plurality of machine windings in series to transfer an energy stored in the two of the plurality of machine windings to the RESS during a first operational state and an open state to prevent current flow between the off-board power source and the plurality of machine windings; and an inductor connected in series between the two of the plurality of machine windings and the off-board power source, wherein the inductor is configured to mitigate at least one of current ripple or torque ripple;

wherein the power inverter comprises a set of semiconductor switches that are configured to convert direct current (DC) power to alternating current (AC) power;

wherein each semiconductor switch of the set of semiconductor switches comprises a voltage-controlled switching device;

wherein the power inverter comprising a plurality of phase legs including a first phase leg, a second phase leg, and a third phase leg, each phase leg of the plurality of phase legs comprising a pair of semiconductor switches of the set of semiconductor switches, wherein each phase leg is connected to a corresponding one of the plurality of machine windings of the traction motor;

wherein during the first operational state, the current flows through the two of the plurality of machine windings to increase a voltage from the off-board power source from a first voltage to a second voltage to the RESS when a first semiconductor switch in the third phase leg that is connected to the two of the plurality of machine windings is closed and the remaining semiconductor switches in the first phase leg, the second phase leg, and the third phase leg are open.

2. The electrical system of claim 1, wherein the voltage-controlled switching device comprises at least one of a silicon insulated gate bipolar transistor (IGBT), a silicon carbide metal-oxide semiconductor field effect transistor (MOSFET), a silicon superjunction MOSFET, a Gallium nitride (GaN) field-effect transistor (FET), a SiC junction-gate field-effect transistor (JFET), a wideband-gap (W BG) device, or an ultra-wideband-gap device (UWBG).

3. The electrical system of claim 1, wherein at least one semiconductor switch of the first phase leg and the second phase leg are pulse-width modulated to allow current flow through at least one of the first phase leg and the second phase leg.

4. The electrical system of claim 1, wherein the during a boost operating state when the switch is closed, the current flows through the two of the plurality of machine windings but not to the RESS when a second semiconductor switch in the third phase leg that is connected to the two of the plurality of machine windings is closed and the remaining semiconductor switches in the first phase leg, second phase leg, and third phase leg are open.

5. An electrical system, comprising:
a rechargeable energy storage system (RESS);
a power inverter connected to the RESS, the power inverter configured to provide electrical power to a traction motor; a plurality of machine windings of the traction motor;

a plurality of machine windings of the traction motor connected to the power inverter, the plurality of machine winding including a first winding, a second winding, and a third winding;

a switch connected directly to only the first winding of the plurality of machine windings and connected to an off-board power source; and a controller connected to the switch and to a power inverter controller, wherein the controller is configured to transmit control signals to the power inverter controller and to the switch to allow current flow from the off-board power source through the first winding and the second winding of the plurality of machine windings in series to transfer an energy stored in the first winding and the second winding to the RESS during a first operational state and to prevent current flow between the off-board power source and the plurality of machine windings during a second operational state wherein the power inverter comprises a set of semiconductor switches that are configured to convert direct current (DC) power to alternating current (AC) power;

wherein each semiconductor switch of the set of semiconductor switches comprises a voltage-controlled switching device;

wherein the power inverter comprising a plurality of phase legs including a first phase leg, a second phase leg, and a third phase leg, each phase leg of the plurality of phase legs comprising a pair of semiconductor switches of the set of semiconductor switches, wherein each phase leg is connected to a corresponding one of the plurality of machine windings of the traction motor;

wherein at least one semiconductor switch of a first phase leg and a second phase leg are pulse-width modulated to allow current flow through at least one of the first phase leg and the second phase leg;

wherein current flows through the first winding and the second winding to increase a voltage from the off-board power source from a first voltage to a second voltage during the first operational state, when a first semiconductor switch in the third phase leg that is connected to the first winding and the second winding is closed and the remaining semiconductor switches in the first phase leg, the second phase leg, and the third phase leg are open.

6. The electrical system of claim 5, further comprising an inductor connected in series between the plurality of machine windings and the accessory load, wherein the inductor is configured to mitigate current ripple and torque ripple.

7. The electrical system of claim 5, wherein the voltage-controlled switching device comprises at least one of a silicon insulated gate bipolar transistor (IGBT), a silicon carbide metal-oxide semiconductor field effect transistor (MOSFET), a silicon superjunction MOSFET, a Gallium nitride (GaN) field-effect transistor (FET), a SiC junction-gate field-effect transistor (JFET), a wideband-gap (WBG) device, or an ultra-wideband-gap device (UWBG).

8. The electrical system of claim 5, wherein the controller receives software updates via over-the-air programming.

9. The electrical system of claim 5, wherein the controller is configured to transmit control signals to control the current flow to mitigate torque disturbance and boost converter functionality.

10. A method comprising:
determining whether a connection with an off-board power source has been established; and transmitting at least one control signal when the connection to the off-board power source has been established, the control signal sent to a power inverter connected to rechargeable energy storage system (RESS) and to a switch connected between the power inverter and the off-board power source to command a first operational state, a boost state, and a second operational state, wherein:

in the first operational state the switch is closed and a first semiconductor switch in the power inverter is closed and any remaining semiconductor switches in the power inverter are open to allow current flow from the off-board power source through two of a plurality of machine windings in series to transfer an energy stored in the two of the plurality of machine windings to the RESS;

in the boost state the switch is closed and a second semiconductor switch in the power inverter is closed and the remaining semiconductor switches in the power inverter are open to allow current flow through the two of the plurality of machine windings but not to the RESS; and in the second operational state, the switch is opened to prevent current flow between the off-board power source and the plurality of machine windings.

* * * * *